United States Patent [19]

Onishi et al.

[11] 4,322,756

[45] Mar. 30, 1982

[54] EDITING SYSTEM FOR PCM SIGNAL TAPE

[75] Inventors: Ken Onishi; Minoru Ozaki; Kunimaro Tanaka, all of Amagasaki, Japan

[73] Assignee: Mitsubishi Denki Kabushiki Kaisha, Tokyo, Japan

[21] Appl. No.: 33,986

[22] Filed: Aug. 23, 1979

[51] Int. Cl.³ ............................................. G11B 27/02
[52] U.S. Cl. ...................................................... 360/13
[58] Field of Search ................................ 360/13, 38, 32

[56] References Cited

U.S. PATENT DOCUMENTS

| | | | |
|---|---|---|---|
| 4,000,511 | 12/1976 | Kenney | 360/38 |
| 4,041,453 | 8/1977 | Umeda et al. | 360/38 |
| 4,146,099 | 3/1979 | Matsushima et al. | 360/38 |
| 4,199,780 | 4/1980 | Taylor | 360/38 |
| 4,234,896 | 11/1980 | Onishi et al. | 360/32 |

OTHER PUBLICATIONS

"P.C.M. for High Quality Sound Signal Distribution: Protection Against Digit Errors", BBC Research Dept., Report No. 1972/18, pp. 1–11.

"A Study on Adaptive Error Compensations of Digitized Acoustic Signals by the Use of Linear Protection Method", by S. Yamasuda et al., Denshi Tsushin Gakkai, Technological Research Report, vol. 78, No. 93, pp. 13–18.

Primary Examiner—Vincent P. Canney
Attorney, Agent, or Firm—Oblon, Fisher, Spivak, McClelland & Maier

[57] ABSTRACT

An editing system for reproduction of coded voice signals including means for smoothly connecting signals in front and back of a connecting part to prevent a click sound caused by the sudden level change of the reproduced sound produced by the connecting part in editing of a PCM signal tape on which the PCM signal is recorded. With such means, the click sound produced at the connecting part can be eliminated either from a hand cutting edition or an automatic electronic edition and the reproduction of the PCM signal after the edition of the PCM signal can be precisely performed.

7 Claims, 13 Drawing Figures

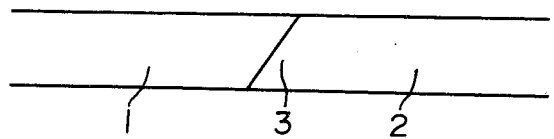
F I G. 1
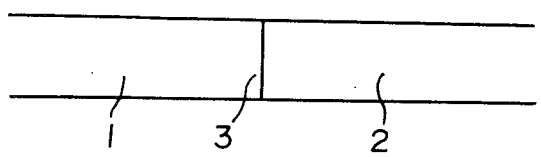
F I G. 2
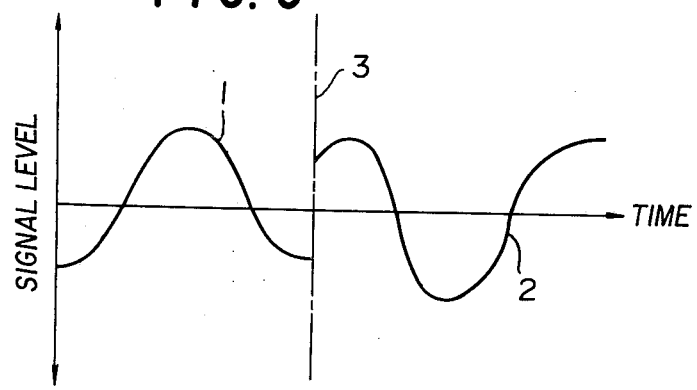
F I G. 3
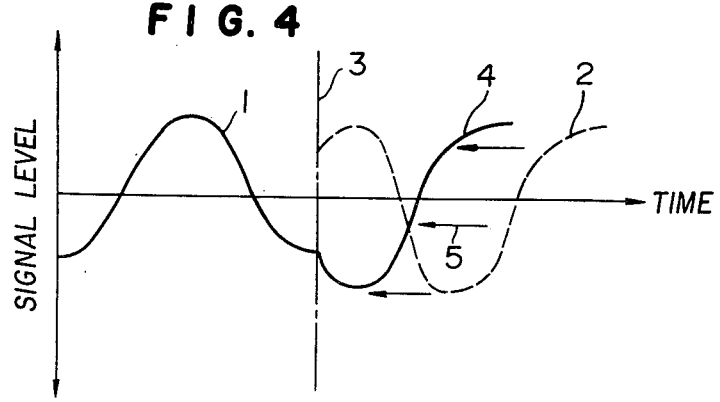
F I G. 4

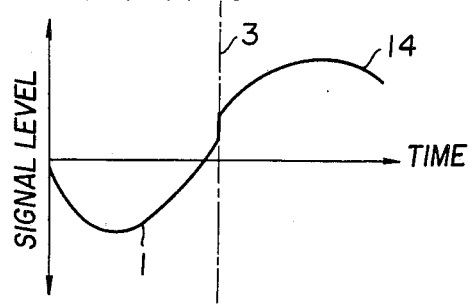
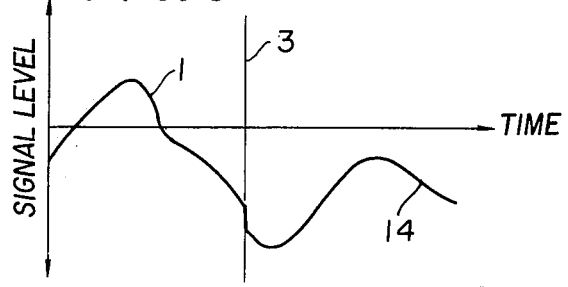
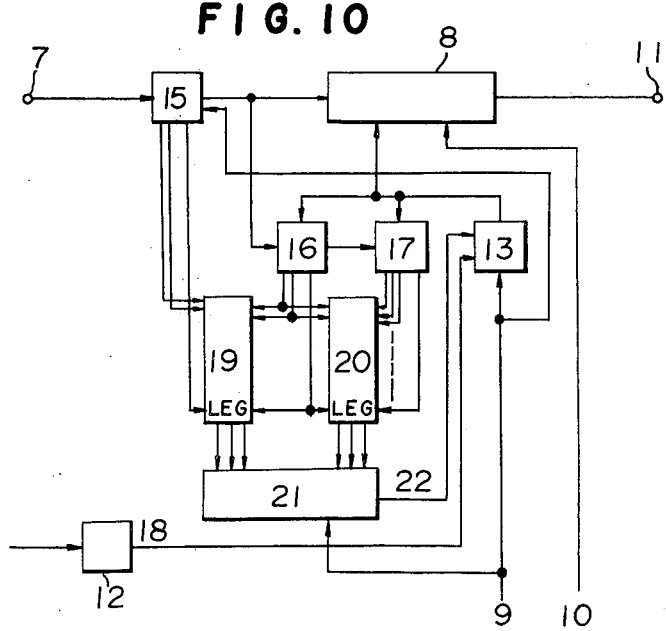

EDITING SYSTEM FOR PCM SIGNAL TAPE

BACKGROUND OF THE INVENTION

1. Field of the Invention

The present invention relates to an editing system for reproduction of a coded voice signal (hereinafter referring to as PCM signal).

2. Description of the Prior Art

Two kinds of editions a hand cutting edition and an automatic electronic edition of a PCM signal are known for the edition in a PCM recorder.

In order to simplify the illustration, a hand cutting edition in the fixed bed type PCM recorder will be illustrated.

FIG. 1 shows a PCM signal tape (hereinafter referring to as tape) which is edited by means of a hand cutting edition in an analogue recorder, wherein the reference numeral (1) designates a front signal; (2) designates a back signal; and (3) designates a connected part. The tape is cut slanted and is connected as shown in FIG. 1.

Therefore, when the edited part is reproduced, the front signal (1) is gradually decreased and the back signal (2) is gradually increased whereby the sound is smoothly reproduced due to the smooth connection even though the phase of the wave of the front signal (1) is not equal to the phase of the wave of the back signal (2) at the edited part.

In the case of the fixed head type PCM recorder, the cutting direction of the tape at the connecting part is perpendicular or substantially perpendicular to the longitudinal direction of the tape as shown in FIG. 2 because of the signal recording pattern. Therefore, the reproduced signal occurs briefly as shown in FIG. 3 whereby a click sound is disadvantageously generated when the phase of the front signal (1) is not equal to the phase of the back signal (2) at the connected part.

SUMMARY OF THE INVENTION

It is an object of the present invention to overcome the above-mentioned disadvantage and to prevent a sudden change of the level of reproduced sound caused at the connected part of the tape in the edition of PCM signal tape.

BRIEF DESCRIPTION OF THE DRAWINGS

FIGS. 1 and 2 show tapes prepared by a hand cutting edition;

FIG. 3 is a waveform diagram showing a reproduction output given by a tape in the conventional system;

FIGS. 4 and 5 respectively are waveform diagrams for illustrating the present invention;

FIGS. 7, 8 and 9 respectively are waveform diagrams for illustrating the present invention;

FIG. 10 is a circuit diagram for one embodiment of the present invention;

DESCRIPTION OF THE PREFERRED EMBODIMENTS

The present invention is to prevent the click sound by forming a back signal (4) having a level equal to the level of the front signal (1) at the connected part (3) by shifting the time position of the back signal (2) to the arrow line (5) as shown in FIG. 4 and then connecting the back signal to the front signal.

The time shift in this case is small and is negligible in the experiments.

Figure 5:
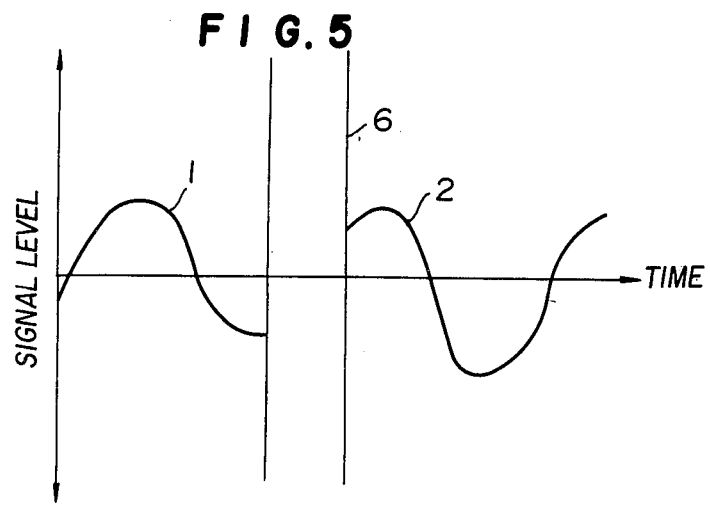

FIG. 5 shows the waveform of FIG. 3 in detail. In practice, the contact of the magnetic head with the tape is deteriorated at the connected part of the tape, and a term (6) which causes many signal errors is found. Usually, the PCM recorder has a signal error correcting circuit whereby the signal errors caused by an adhesion of dust on the magnetic tape are corrected. The signal errors caused during the error causing term (6) are remarkably beyond the correcting capability of the error-correcting circuit. Therefore, such signal errors are eliminated by means of the method of FIG. 4.

Figure 6:
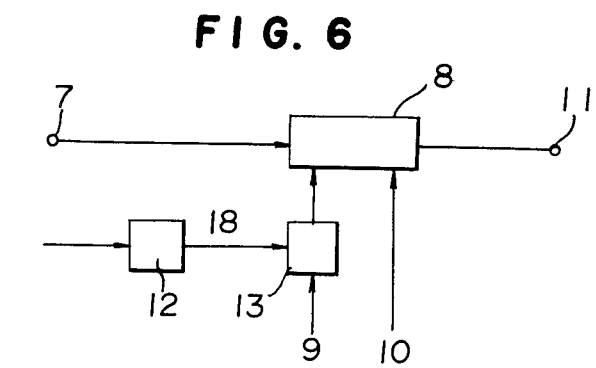
FIG. 6 is a block diagram for illustrating an embodiment of the system of the present invention.

FIG. 6 shows a signal-processing curcuit for the elimination. The reproducing signal fed to the input terminal (7) is writen in a memory (8) by a write-in clock (9) and is read-out by a read-out clock (10) and it is delayed for a specific time and transmitted from the output terminal (11).

When many errors are caused in the reproducing signal, a STOP signal (18) is generated from an error-detecting part (12) and the write-in clock gate (13) is closed to stop the write-in of the reproducing signal to the memory (8). When the errors are decreased after the error causing term (6), the write-in of the reproducing signal to the memory is started again by opening of gate (13) whereby the output at the output terminal is has eliminated therefrom the many error causing term (6) as shown in FIG. 3.

When the write-in of the reproducing signal to the memory (8) is started again, the quantity of the signal in the memory (8) is decreased by an amount corresponding to the signal during the term stopping the write-in of the signal to the memory (8). When many edited parts are found, there is a possibility that in the memory (8) is empty. Therefore, the tape speed is slightly faster than the normal speed for a specific term just after stopping the stop of the write-in clock and the input signal to the memory (8) is slightly increased over the output signal to fill the data in the memory (8). Even though such operation is performed, there is a possibility that the level of the front signal (1) is not equal to the level of the back signal (2) at the connected part (3) as shown in FIG. 3. In such case, the gate (13) is closed to form the back signal (4) until the level of the back signal (2) reaches the level of the front signal (1) as shown in FIG. 4. Ideally that the level of the front signal is equal to that of the back signal as shown in FIG. 4. In practice, it is considered best that the gate (13) is closed to stop the write-in of the front signal in the memory until the initial value of the back signal is in a specific range level relative to the last value of the front signal. In such a case, it is important to conform the slants of the signals as well as to conform the levels of the signals.

Figure 7:
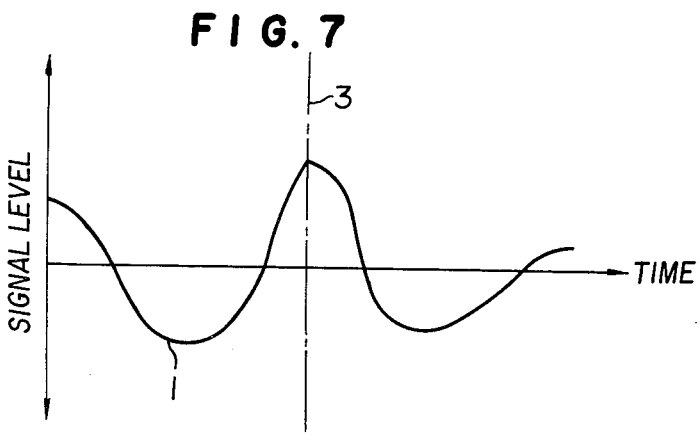

In accordance with the experiments, when it is attained to conform the levels, but not to conform the slants as shown in FIG. 7, click sound is generated.

In the practical application of the concept, the sampling and quantization of the PCM signals are not constant whereby the number of samples having equal level and equal slant of the front signal (1) to the back signal (2) is quite small.

The present invention has been considered from these viewpoints and has been based on the following experimental fact.

When the differential coefficient of the front signal (1) is positive (or negative) at the connected part (3) as shown in FIG. 8 and FIG. 9, and the front signal is connected to the first sample of the back signal (14) having a positive (or negative) differential coefficient and having a value closest to larger (or smaller) than that of the last sample of the front signal (1), the click sound is remarkably small. There is high probability to obtain such samples whereby the quantity of the eliminated signal can be minimized.

FIG. 10 is a signal connection circuit diagram for another embodiment of the present invention, which is an improvement of the embodiment of FIG. 6.

In FIG. 10, the reference numerals (15), (16), (17) designate shift registers for memorizing for each one sample; (19), (20) designate comparators; (21) designates a logic circuit; and (22) designates a START signal formed by the logic circuit (21).

The reproducing signal received by the input terminal (7) is passed through the shift register (15) and written in the memory (8) and sequentially written in the shift registers (16), (17) driven by the write-in clock (9). When the STOP signal is output from the error detecting part (12) to close the gate (13) the write-in to the memory (8) and shift registers (16), (17) is stopped. At the time, the sample just before generation of the STOP signal is memorized in the shift register (16) and the sample just before this sample is memorized in the shift register (17).

Figure 11:
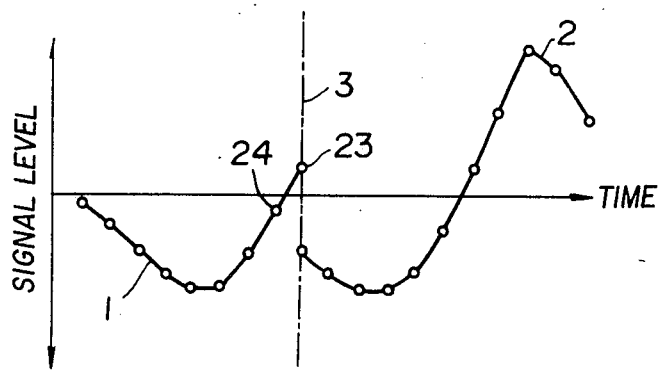
FIG. 11 is a waveform for illustrating the waveform diagram of FIG. 3 in detail.

FIG. 11 shows the condition. At the connected part (3), the STOP signal is generated to memorize the sample (23) in the shift register (16) and to memorize the sample (24) in the shift register (17). On the other hand, the clock is continuously fed to the shift register (15) whereby the samples of the back signal (2) are successively passed.

When the input applied to the right side of the comparator is larger (or smaller) than the input in applied to the left side of the comparator, "1" is output at the output terminal G (or L). When they are equal, "1" is output at the output terminal E. In the comparator (20), the samples (23), (24) are input. When the differential coefficient just before the connected part (3) is positive (or negative), "1" is output at the terminal L (or G). The sample (23) and the samples of the back signal (2) are sequentially input into the comparator (19). Therefore, when the differential coefficient of the back signal (2) is positive (or negative), the input in right side of the comparator (19) is increased (or decreased) depending upon time. When the differential coefficient of the front signal is positive (or negative), the time at the connected condition shown in FIG. 8 (or FIG. 9) is the time changing from "1" at the terminal G (or L) of the comparator (19) to "1" at the terminal L (or G) of the comparator (19). Therefore, the START signal is output from the logical circuit (21) to open the gate (13) to feed the clock signal (9) again.

Figure 12:
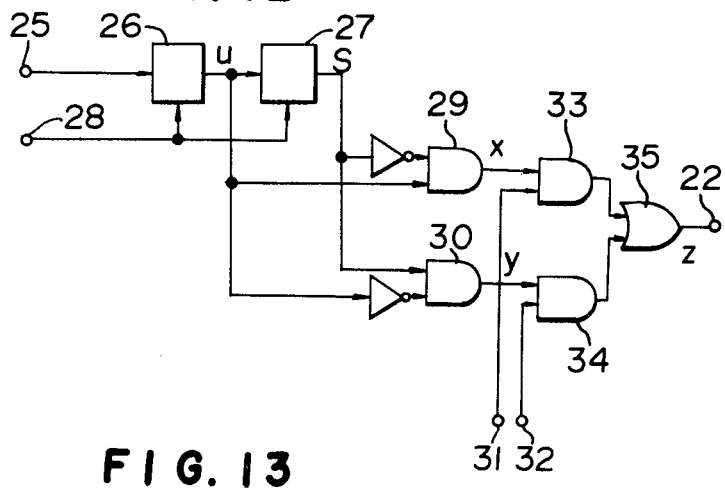
FIG. 12 is a block diagram of the logic circuit in FIG. 10.

FIG. 12 shows a logical circuit (21) for generating the START signal shown in FIG. 10 and the input terminal (25) is connected to the L terminal and the E terminal of the comparator (19). The reference numerals (26), (27) designate one bit memories and the memories are triggered by the clock (9) synchronized to the sample whereby the memory data are shifted for each one sample to right direction. The outputs of one bit memories are operated by the gate circuit. The outputs of AND gates (29), (30) are given by the equations:

$$x = \bar{v} \times u$$

$$y = \bar{u} \times v$$

wherein the reference u designates the output of the one bit memory (26); v designates the output of one bit memory (27). Therefore, x is 1 when the level of the back signal (2) is changed from smaller than the level of the sample (23) to larger than the same, whereas y is 1 in the reverse condition.

On the other hand, the input terminal (31) is connected to the terminals L and E of the comparator (20) whereas the input terminal (32) is connected to the terminal G of the comparator (20) whereby the output of the gate (33) is "1" when the differential coefficient of the front signal (1) is positive and the level of the back signal (2) is over the level (23) of the front signal as shown in FIG. 8, whereas the output of the gate (34) is "1" in the reverse condition shown in FIG. 9. Therefore, the output (22) of the OR gate (35) is the START signal.

The embodiment of the hand cutting compilation has been illustrated. Thus, it is possible to apply the concept of the present invention to the electronic edition.

Figure 13:
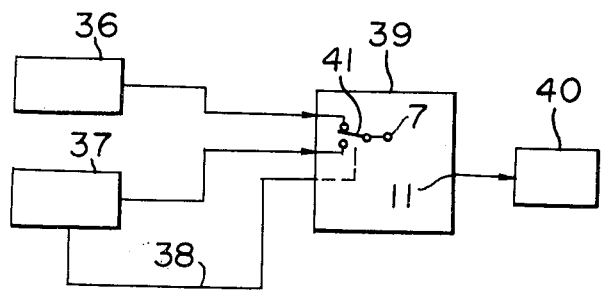
FIG. 13 is a block diagram of another embodiment of the present invention.

FIG. 13 is a block diagram of one embodiment of the electronic edition wherein the recorder (37) outputs the front signal (1) and the recorder (36) outputs the back signal (2).

The recorder (37) has address signals corresponding to the sound samples to output an edited part signal (38) formed by the address signal at the time of reproducing the edited part (3). The recorder (40) is to record the edited signal. An adapter (39) for electronic edition has internally a switch SW (41) which is driven by the edited part signal (38).

In the electronic edition, the recorders (37), (38) are simultaneously driven in parallel so as to conform the period of the sample for the musical signal at the same time. At the beginning, the front signal (1) is applied to the input terminal (7) of the signal-connecting circuit in the adapter (39). At the edited part (3), the edited part signal (38) is generated to switch the switch (41) and at the same time, the edited part signal (38) is used instead of the STOP signal (18) to stop the write-in of the signal to the memory (8). After this time, the connections of the signal at the edited parts are performed by the same operation. As described above, in accordance with the present invention for editing in the PCM recorder, the signals accurring until a sample is substantially equal in level to the sample just before the edited part appears in the back signal (2) are eliminated, thereby preventing the abnormal sound at the edited part.

What is claimed is:

1. An editing system for a PCM signal tape, comprising:
    means for detecting an edited part of the tape;
    a detecting-memorizing means for detecting predetermined characteristics of the waveforms of a front signal and a back signal which are respectively recorded in front of and in back of the edited part and for memorizing said elements;

stopping means for stopping the write-in of the back signal in a memory at the time of the detection of the editing part;

detecting means for comparing the predetermined characteristics of the front signal and the back signal and for detecting the occurrence of a predetermined relative relationship therebetween; and resetting means for resetting the stop of the write-in upon the occurrence of the predetermined relative relationship.

2. An editing system for PCM signal tape according to claim 1, wherein said predetermined characteristics are levels of the front signal and the back signal and the detecting means comprises means for detecting when the difference of the signal levels is in a predetermined range.

3. An editing system for PCM signal tape according to claim 2, further comprising:
   a memory for storing the front signal and the back signal;
   means for stopping the write-in of the back signal to the memory depending upon the output given by the detecting means.

4. An editing system for PCM signal tape according to claim 1, further comprising:
   said predetermined characteristics being a sign of the value given by successive subtraction of the value of each successive back signal from the final value of the front signal at the time of detection of the editing port, and a slant of the front signal and the back signal; and
   detecting means for detecting when the slant of the back signal is in the same direction as the slant of the front signal and the absolute value of the back signal exceeds the absolute value of the final front signal.

5. An editing system for PCM signal tape according to claim 4, further comprising:
   a memory clocked by a write-in clock for storing the front signal and the back signal;
   first and second shift registers for sequentially storing successive values of the front signal at respective discrete times in the detection of the editing part;
   first comparator for comparing the output of the first register with values of the back signal at the discrete times;
   a second comparator for comparing the outputs of the first and the second registers;
   third and fourth registers for sequentially storing successive outputs of the first comparator;
   first gate circuit having as inputs an output of the third register and the logical inverse of an output of the fourth register;
   a second gate circuit having as inputs an output of the fourth register and the logical inverse of an output of the third register;
   a third gate circuit having as inputs an output of the first gate circuit and an output of the second comparator; and
   fourth gate circuit having as inputs the output of the second gate circuit and another output of the second comparator;
   wherein said third and fourth gates generate outputs for resetting the stop of the write-in when the slant of the back signal is in the same direction as the slant of the front signal and the absolute value of the back signal exceeds the absolute value of the front signal.

6. An editing system for a PCM signal tape according to claim 1, further comprising:
   said predetermined characteristics being the levels and slants of the front signal and the back signal;
   means for detecting when the back signal is greater than the front signal within a predetermined range when the front signal has a positive slant, and when the front signal is greater than the back signal within a predetermined range when the front signal has a negative slant.

7. An editing system for a PCM signal tape according to any one of claims 1 through 6, further comprising:
   respective source means for providing said front and back signals; and
   switching means for selecting alternatively said respective source means to combine said front and back signals.

* * * * *